June 18, 1935.  R. R. HAUGH  2,004,943
METHOD OF TESTING COLOR OF EGG YOLKS
Filed Dec. 30, 1932
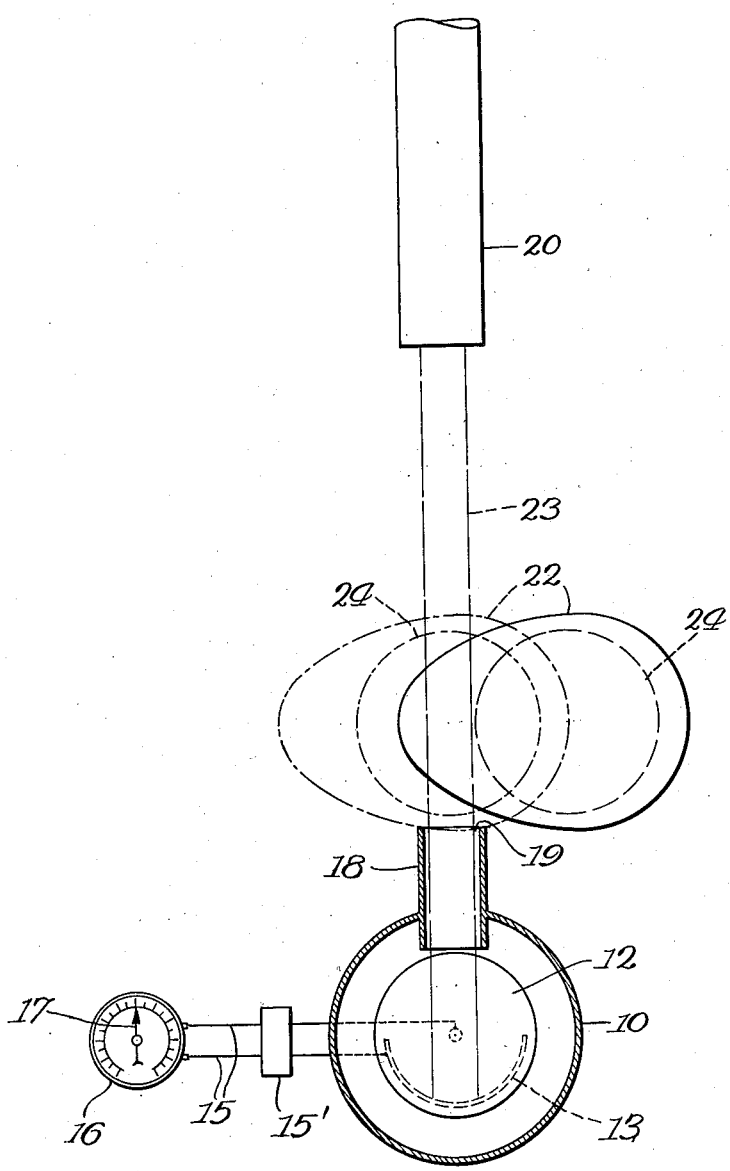
Inventor:
Raymond R. Haugh
By Fisher, Clapp, Soans & Pond,
Attys.

Patented June 18, 1935

2,004,943

UNITED STATES PATENT OFFICE 2,004,943

METHOD OF TESTING COLOR OF EGG YOLKS

Raymond R. Haugh, Chicago, Ill., assignor, by mesne assignments, to Kraft Egg Machine Company, Chicago, Ill., a corporation of Delaware Application December 30, 1932, Serial No. 649,498

5 Claims. (Cl. 99—6)

In marketing eggs, the color of the yolks is an important factor, inasmuch as certain people prefer eggs having either dark or light yolks, and also for the reason that yolks of a particular shade are preferred for specific purposes, as for cake baking, cooking, etc.

An object of my invention, therefore, is to provide a method of automatically testing the color of egg yolks and providing a numerical index which will clearly indicate the same, whereby eggs may be graded according to the color of the yolks quickly and accurately, thus avoiding fatigue of operators and error due to human factors.

Various other objects and advantages will become apparent as the description proceeds.

Referring now to the drawing forming a part of the specification and disclosing a preferred embodiment of my invention, the numeral 10 indicates a light-proof housing of any suitable material, such as metal or the like, for a photo-electric cell 12. This cell may be of any suitable type but is preferably of the electronic type, capable of giving a substantially constant output of current for a given light intensity falling upon the cathode 13 thereof, and not subject to appreciable fatigue. The cell 12 is mounted in a suitable socket (not shown) arranged in the housing 10 and is connected by conductors 15 to a suitable device 16 for measuring minute variations of current, such as a micro-ammeter, a suitable amplifier 15' being arranged in the circuit.

The housing 10 may be provided with an annular flange 18 defining an opening 19 through which light may be transmitted into the housing and upon the cathode 13 of the cell 12.

Arranged exteriorly of the housing 10 and opposite the opening 19 is a device indicated diagrammatically at 20 for projecting a substantially parallel beam of light through the opening 19 and upon the cathode 13 of the cell. The device 20 may be a suitable optical system for converting light from a source (not shown), such as a lamp or the like, into a substantially parallel beam.

In the operation of the device, an egg 22, which has been tested by a suitable candling device and found to be of good quality, is first placed in a position substantially as shown in full lines, at which the beam of light 23 will pass transversely through the egg adjacent its small end. When the egg is in this position, the light will pass through opposite portions of the shell, but will avoid the yolk, indicated at 24. With the egg in this position, the needle 17 of the indicating device 16 is adjusted to a predetermined datum point, such as 0, 100, or any other arbitrary value. In this way, the factor of the light absorbence of the shell will be eliminated. This factor, obviously, will vary with eggs having shells of different colors.

For the final operation, the egg is moved to the dot-and-dash position, with the yolk 24 disposed substantially directly over the opening 19 of the housing 10. In this position the light beam 23 will pass not only through the two layers of shell, as in the previous reading, but also through the yolk 24 and, therefore, the beam of light which will fall upon the cell will be diminished in intensity. This will give a different reading of the needle 17 of the meter and it will be apparent that the difference between the second and first readings will depend upon the opacity of the yolk 24, and may be taken as an index of its color.

It will be obvious that by this method one may quickly and accurately determine the degree of lightness or darkness of the yolk of any egg and the eggs may be graded accordingly. Since the results are obtained mechanically, all errors due to the human factor, eye fatigue, etc., are eliminated.

Obviously, the sequence of readings described above may be reversed if desired, but the sequence given has been found to be the most satisfactory and convenient, since it eliminates the shell factor at the outset.

Another way of arriving at equivalent results would be as follows: After taking the first reading as described above, the egg is moved as described and the intensity of the light beam so adjusted, as by varying the resistance of the light circuit, that the second reading of the meter 16 will be identical with the first. The index of opacity will be obtained by measuring the difference in energy of the light source in the two operations. This may conveniently be obtained from readings of an ammeter or similar electrical indicating device in the circuit of the light source, although other means of measuring the energy of the light source will suggest themselves.

Various modifications and improvements coming within the spirit of my invention will doubtless suggest themselves to those skilled in the art and, hence, I do not wish to be restricted to the details described and shown herein or uses mentioned, except to the extent indicated in the appended claims, which are to be interpreted as broadly as the state of the art will permit.

I claim as my invention:

1. A method of determining the color or opacity of an egg yolk in the shell, comprising passing a light beam through an egg so as to avoid the yolk and also passing a light beam through said egg including the yolk, obtaining by electrical indicating means an index of the light transmitted on the two occasions, and computing the difference in energy involved in the two operations, said difference in energy being an index of the color of the egg yolk.

2. A method of determining the color or opacity of an egg yolk in the shell, comprising passing a light beam through an egg so as to avoid the yolk and also passing a light beam of equal intensity through said egg including the yolk, determining the amount of light emitted from the egg on each occasion, and computing the difference, said difference being an index of the color of the egg yolk.

3. A method of determining the color or opacity of an egg yolk in the shell, comprising passing a light beam through an egg so as to avoid the yolk and also passing a light beam through said egg including the yolk, adjusting said light beam so that the intensity of light emitted from the egg on the second occasion will be equal to that of the first occasion, determining the amount of energy represented by said beams, and computing the difference, which difference will be an index of the color of the egg yolk.

4. The method of separating a batch of eggs into grades according to yolk color which consists in successively subjecting the eggs of the batch to the penetration first of a light beam projected through an egg-white-containing end portion of the egg and then to the penetration of the same light beam through an intermediate yolk-containing portion, subjecting a light-sensitive electric current controlling device to the successive light beams emerging from each egg thereby to vary an electric current in accordance with the variation in light intensity emerging from each egg, measuring the respective currents representing the light beams emerging from the egg to determine the screening effect of the yolk on the first-mentioned light beam, and grading the eggs according to said screening effect.

5. The method of determining egg yolk color which consists in projecting a light beam successively through an egg-white-containing end portion of an egg and through an intermediate yolk-containing portion, subjecting a light sensitive electric current controlling device to the successive light beams emerging from the egg to thereby vary an electric current in accordance with the variation in light intensity emerging from the egg, and measuring the respective currents representing the light beams emerging from the egg to determine the screening effect of the yolk on the first-mentioned light beam.

RAYMOND R. HAUGH.